United States Patent [19]
Taylor

[11] Patent Number: 5,627,736
[45] Date of Patent: May 6, 1997

[54] POWER SUPPLY NOISE FILTER

[75] Inventor: Gregory F. Taylor, Portland, Oreg.

[73] Assignee: Intel Corporation, Santa Clara, Calif.

[21] Appl. No.: 575,610

[22] Filed: Dec. 20, 1995

[51] Int. Cl.$^6$ .............................. H02M 1/14; H02J 1/02
[52] U.S. Cl. ................................................. 363/39
[58] Field of Search ............................. 363/39, 40, 41, 363/53, 56, 124

[56] References Cited

U.S. PATENT DOCUMENTS

| | | |
|---|---|---|
| 4,934,822 | 6/1990 | Higaki ................................. 363/37 |
| 5,319,514 | 6/1994 | Walsh et al. ........................ 361/59 |
| 5,371,667 | 12/1994 | Nakao et al. ....................... 363/124 |

*Primary Examiner*—Robert Nappi
*Assistant Examiner*—Adolf Berhane
*Attorney, Agent, or Firm*—Blakely, Sokoloff, Taylor & Zafman

[57] ABSTRACT

A method and an apparatus for filtering noise from power supplied to a noise sensitive load. A voltage supply circuit is coupled between a first voltage and a second voltage provided on a chip. The voltage supply circuit is configured to supply third voltage. A filter circuit is coupled to the voltage supply circuit to receive and to filter the third voltage. A transistor is coupled between the first voltage and the noise sensitive load and the filter circuit is coupled between the gate of the transistor and the voltage supply circuit. The transistor is coupled in a source follower configuration so as to supply a filtered fourth voltage to the noise sensitive load. In one embodiment, the voltage supply circuit comprises a diode configured transistor such that the output third voltage is equal to the second voltage plus the threshold voltage of the source follower configure transistor. The filter circuit then filters the third voltage and the transistor drops the voltage by the threshold voltage resulting in the noise sensitive load receiving a noise filtered voltage equal to the second voltage.

20 Claims, 2 Drawing Sheets

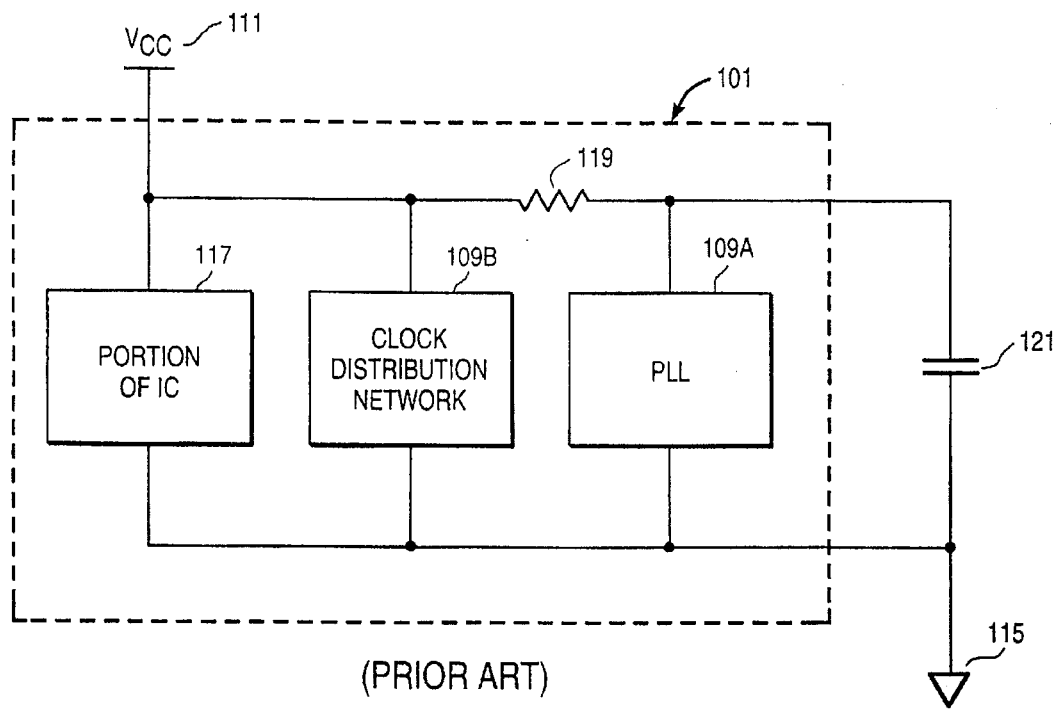
(PRIOR ART)
FIG_1
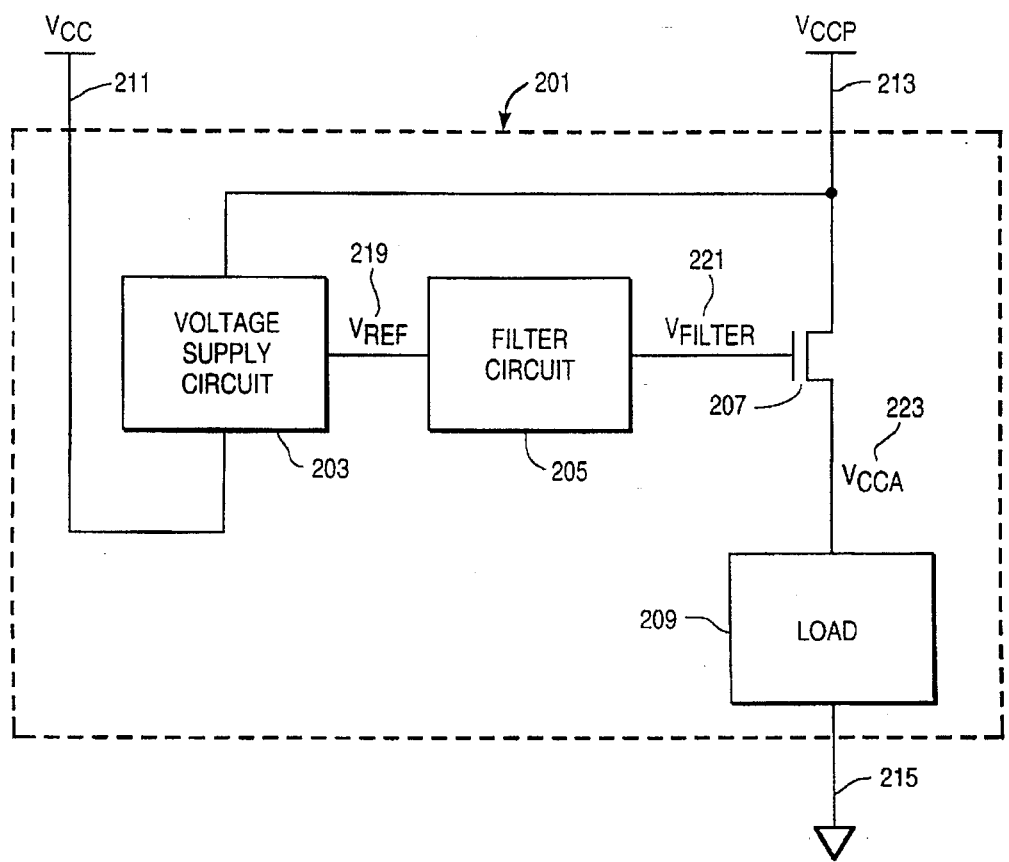
FIG_2

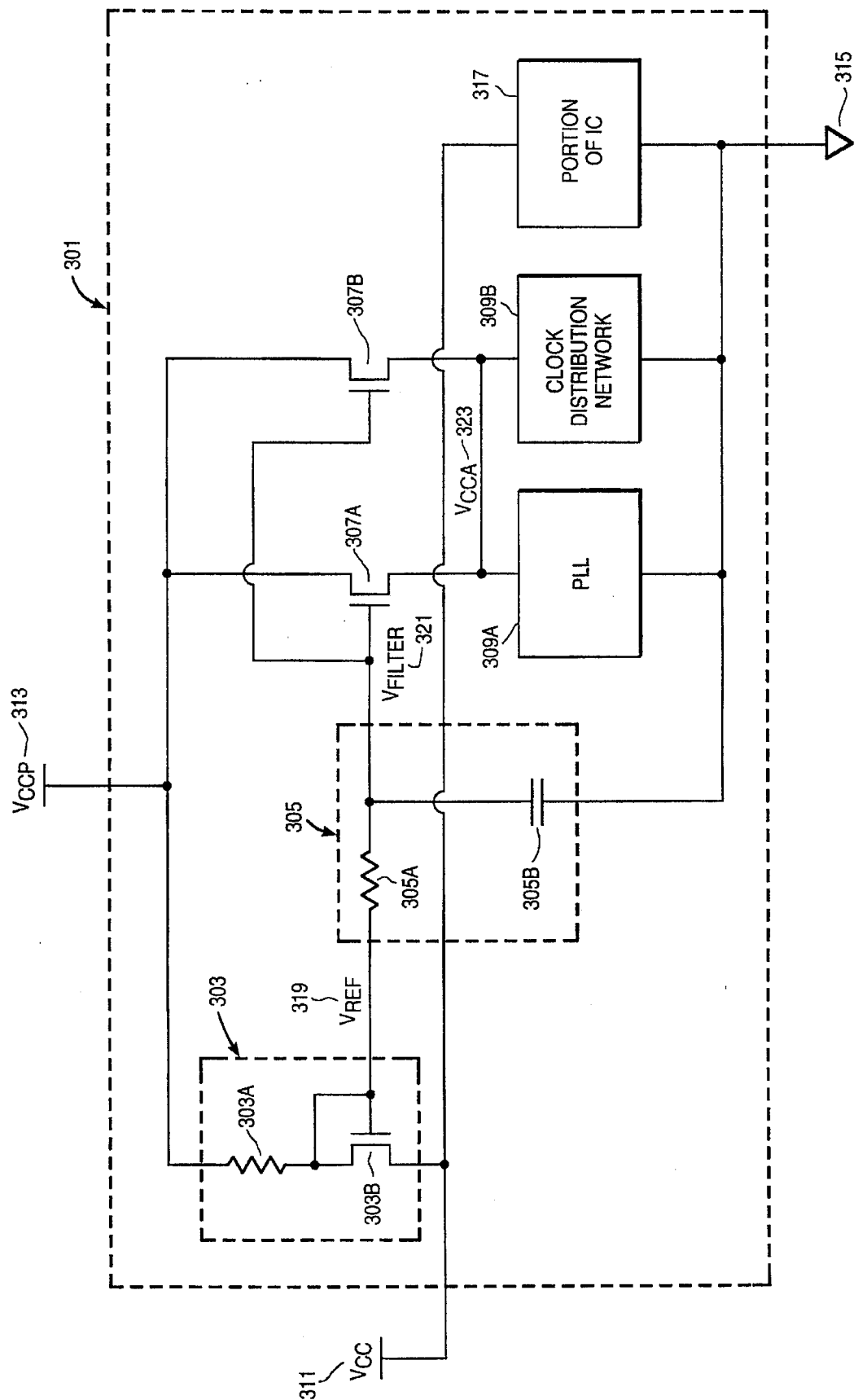
FIG_3

POWER SUPPLY NOISE FILTER

FIELD OF THE INVENTION

The present invention relates generally to integrated circuits and more specifically, the present invention relates to a method and an apparatus for supplying power to an integrated circuit or a portion thereof.

BACKGROUND OF THE INVENTION

In the integrated circuit industry there is a continuing effort to increase microprocessor speed as well as decrease microprocessor device sizes. As microprocessors become more complex, modern microprocessors contain more devices and are pushed to run as fast as possible. These efforts have a number of implications. As integrated circuit device dimensions decrease, the amount of voltage that can be tolerated by such devices also decreases. In addition, as clock speeds increase, integrated circuits become increasingly sensitive to power supply noise and clock skew becomes more critical.

In general, microprocessor integrated circuit operations are typically controlled with a clock. To distribute the clock signal through the large microprocessor integrated circuits of today, a clock distribution network is generally used. Typically, it is necessary for microprocessor designers to use a phase locked loop or some other clock generation element to minimize the delay and skew of a clock signal distributed around a large integrated circuit with the clock distribution network. In addition, it is appreciated that integrated circuit storage elements have minimum hold time requirements. As a result, the minimum delays permitted between storage elements in order to meet hold times can complicate efforts to reduce delay along certain paths. Since the required minimum delay required by integrated circuit storage elements is directly related to the clock skew across a chip, it is noted that these skews must be tightly controlled. In order for a phase lock loop circuit to control effectively clock skew in a distribution network, it is vital that power supply noise is minimized in the integrated circuit.

FIG. 1 shows a prior art power supply noise filter configuration having a portion of an integrated circuit 117, e.g. a microprocessor core, on a chip 101 including a clock distribution network 109B and a phase locked loop 109A. Power is supplied to the chip elements 117, 109B and 109A at $V_{CC}$ 111. As shown in FIG. 1, the power supply for phase locked loop 109A is filtered through an RC delay circuit comprised of resistor 119 and capacitor 121. Since all of the DC current drawn by phase locked loop 109A flows through resistor 119, the maximum value of resistor 119 is constrained to a relatively small value in order to minimize any DC voltage drop which might occur as a result of DC current flowing through resistor 119.

For example, in the prior art power supply noise filter of FIG. 1, resistor 119 is limited to a maximum value of only ten ohms. In that prior art embodiment, $V_{CC}$ 111 is equal to 1.8 volts and phase locked loop 109A draws twenty milliamps which causes a 200 millivolt DC voltage drop across resistor 119. Accordingly, only about 1.6 volts is supplied to phase locked loop 109A in the prior art embodiment even though 1.8 volts is supplied at $V_{CC}$ 111. Since phase locked loop 109A receives less voltage than the portion of integrated circuit 117 and clock distribution network 109B, i.e. 1.6 volts instead of 1.8 volts, the effectiveness of phase locked loop 109A is thereby compromised.

Furthermore, since resistor 119 of the power supply noise filter of FIG. 1 is constrained to a such small value, it is appreciated that a large capacitor is necessary in order to realize a relatively large RC time constant. Thus, if the RC delay of the filter is to be any larger than ten or twenty nanoseconds, an external off chip capacitor is needed since large on chip capacitors are difficult to build. For example, in the prior art configuration shown in FIG. 1, off chip capacitor 121 would need to have a value of 100 microfarads in combination with resistor 119 having a resistance of ten ohms to obtain an RC time constant of one millisecond. It is noted that even though a large external off chip capacitor permits larger RC time constants, the large external capacitor could introduce detrimental effects such as series inductance which would reduce its effectiveness.

As further shown in FIG. 1, the power supplied to clock distribution network 109B is not filtered with the prior art power supply noise filter. The reason why the power supplied to clock distribution network 109B is not filtered is because an excessive DC current would be drawn by clock distribution network 109B thereby resulting in an unacceptable DC voltage drop across resistor 119, assuming that a significant resistance were to be utilized in the incorporation of a useful RC filter. As a result, the portion of integrated circuit 117 of FIG. 1 must suffer the effects of unfiltered power supplied to clock distribution network 109B from $V_{CC}$ 111 without the benefit of the prior art power supply noise filter.

Therefore, what is needed is a filter to reduce noise from the power supplied to elements of an integrated circuit such a microprocessor. The power supply noise filter would not be limited by the risk of unacceptably high DC voltage drops. In addition, filter elements of the power supply noise filter would be on chip and provide the ability to employ reasonably large RC time constants without the need to use large off chip capacitors. Accordingly, the power supply noise filter could be used to filter noise from the power supplied to a variety of integrated circuit elements. For example, the power supply noise filter may be used to filter simultaneously noise supplied to the phase locked loop circuitry as well as the clock distribution network circuitry of a microprocessor. The power supply noise filter would effectively eliminate the power supply noise induced skew associated with distributing a clock signal throughout a modern large integrated circuit such as a microprocessor.

SUMMARY OF THE INVENTION

A method and an apparatus for filtering noise from power supplied to a noise sensitive load is disclosed. In one embodiment, a voltage supply circuit is coupled between a first voltage and a second voltage. The voltage supply circuit is configured to supply a third voltage. A filter circuit is coupled to the voltage supply circuit to receive the third voltage and generate a filtered third voltage. A transistor is coupled between the first voltage and the noise sensitive load. The filter circuit is coupled between the gate of the transistor and the voltage supply circuit. Thus, the gate of the transistor receives the filtered third voltage. The first transistor is also coupled in a source follower configuration. Accordingly, the noise sensitive load is supplied with a fourth voltage through the source follower configured transistor whose gate is driven by the filtered third voltage. Additional features and benefits of the present invention will become apparent from the detailed description, figures and claims set forth below. Other features and advantages of the present invention will be apparent from the accompanying drawings and from the detailed description which follows below.

BRIEF DESCRIPTION OF THE DRAWINGS

The present invention is illustrated by way of example and not limitation in the accompanying figures.

FIG. 1 illustrates a prior art power supply noise filter coupled to a portion of an integrated circuit, a clock distribution network and a phase locked loop circuit.

FIG. 2 illustrates the present power supply noise filter in block diagram form.

FIG. 3 is a schematic of one embodiment of the present power supply noise filter.

DETAILED DESCRIPTION

A method and an apparatus for filtering noise from power supply to a noise sensitive load is disclosed. In the following description, numerous specific details are set forth such as specific devices, resistances, capacitances, etc. in order to provide a thorough understanding of the present invention. It will be obvious, however, to one having ordinary skill in the art that the specific details need not be employed to practice the present invention. In other instances, well known materials or methods have not been described in detail in order to avoid unnecessarily obscuring the present invention.

As described earlier, integrated circuits such as microprocessors are becoming increasingly smaller and faster. Due to the reduced dimensions of integrated circuit devices, such as the circuitry found in the core of microprocessors, the power supply voltage which can be tolerated at the core of such a microprocessor is constantly decreasing. However, in order to maintain compatibility with previous generations of products, it is often desirable to have the I/O circuitry of a microprocessor run at a higher voltage than the core circuitry of the microprocessor. With this consideration in mind, it is likely that there will be one or more other chips in a system that run at a higher voltage than the core of a modern microprocessor. That is, in addition to the microprocessor, or CPU, power supply, $V_{CC}$, a second higher power supply, $V_{CCP}$, may be available.

The present invention described herein reduces the power supply noise which can interfere with the operation of a phase locked loop and increase the skew of a clock distribution network by utilizing the second higher power supply, $V_{CCP}$, in conjunction with the CPU power supply, $V_{CC}$. In addition to reducing AC noise on the power supply, the present invention has the ability to reduce also the DC voltage drops which may be present in a large circuit. This feature is particularly important for a clock distribution network which needs to distribute a clock signal across a large chip. It is appreciated that if a clock distribution network power supply is shared with the power supply of microprocessor core circuitry, then noise generated from the microprocessor core could cause the delay of the gates in the clock distribution network to vary.

In FIG. 2, the present invention is illustrated in block diagram form. As discussed above, CPU power supply $V_{CC}$ 211 and a second higher power supply $V_{CCP}$ 213 are utilized by the present invention. The power supply noise filter is comprised of voltage supply circuit 203, filter circuit 205, and transistor 207. Voltage supply circuit 203 is coupled to receive power from both $V_{CC}$ 211 and $V_{CCP}$ 213. Filter circuit 205 is coupled to receive the reference voltage $V_{REF}$ 219 output by voltage supply circuit 203. Filter circuit 205 filters noise out of reference voltage $V_{REF}$ 219 and generates filtered reference voltage $V_{FILTER}$ 221. It is appreciated that the DC potential of filtered reference voltage $V_{FILTER}$ 221 is substantially equal to the DC potential of reference voltage $V_{REF}$ 219, except that $V_{FILTER}$ 221 has had unwanted noise removed by filter circuit 205. The gate of transistor 207 is coupled to receive the filtered reference voltage $V_{FILTER}$ 221 output from filter circuit 205. Transistor 207 is coupled between $V_{CCP}$ 213 and noise sensitive load 209. Note that in contrast with the prior art power supply noise filter of FIG. 1, all circuit elements utilized by the present invention are on chip 201.

As shown in FIG. 2, transistor 207 is coupled as a source follower. In this configuration, the output voltage of transistor 207, $V_{CCA}$ 223, is less than the filtered reference voltage $V_{FILTER}$ 221, by the threshold voltage of transistor 207, $V_{TN}$. With transistor 207 coupled in a source follower configuration, there is effectively zero DC input current flowing into the gate of transistor 207. Accordingly, filter circuit 205 can be implemented with an RC filter having a resistor with a high amount of resistance. In contrast with the prior art power supply noise filter shown in FIG. 1, there is effectively zero DC voltage drop across filter circuit 205 since there is no DC input current flowing into the gate of transistor 207. Therefore, a resistor with a high resistance value may be used by the present invention which therefore eliminates the need for a large off chip capacitor in order to realize a filter having a relatively high RC time constant. Thus, the present invention provides the ability to implement a filter with a high RC time constant with all RC filter elements on chip.

FIG. 3 shows a schematic of an embodiment of the present invention. As shown in FIG. 3, voltage supply circuit 303 is coupled between CPU power supply $V_{CC}$ 311 and second higher power supply $V_{CCP}$ 313. Voltage supply circuit 303 is comprised of resistor 303A coupled to diode configured transistor 303B. In the embodiment shown in FIG. 3, resistor 303A is coupled to $V_{CCP}$ 313 and transistor 303B is coupled between resistor 303A and $V_{CC}$ 311. The gate of transistor 303B is coupled to resistor 303A and to filter circuit 305. Voltage supply circuit 303 generates reference voltage output $V_{REF}$ 319 which is received by filter circuit 305. It is appreciated that other circuit configurations may be used to generate the reference voltage $V_{REF}$ 319. In the embodiment shown here, diode configured transistor 303B produces reference voltage $V_{REF}$ 319 which is a threshold voltage $V_{TN}$ Of transistor 303B above CPU power supply voltage $V_{CC}$ 311. Depending on the desired reference voltage $V_{REF}$ 319 value, it is appreciated that other types of voltage generation circuitry may be employed, such as other voltage supplies, voltage dividers, etc.

In the embodiment shown in FIG. 3, filter circuit 305 is comprised of resistor 305A coupled to capacitor 305B which is coupled to ground 315. Filter circuit 305 receives input reference voltage $V_{REF}$ 319, filters noise from the voltage, and then generates output filtered reference voltage $V_{FILTER}$ 319. Depending on the RC time constant desired, various values of resistances and capacitances for resistors 305A and 305B may be selected for filter circuit 305.

Coupled to filter circuit 305 are the gates of source follower configured transistors 307A and 307B. As shown in FIG. 3, source follower configured transistor 307A is coupled between higher power supply $V_{CCP}$ 313 and a noise sensitive load, phase locked loop 307A. Source follower configured transistor 307B is coupled between higher power supply $V_{CCP}$ 313 and a noise sensitive load, clock distribution network 307B. Transistors 307A and 307B generate the output voltage $V_{CCA}$ 323 supplied to phase locked loop 307A and clock distribution network 307B. A portion of integrated circuit 317 is coupled to receive power from $V_{CC}$ 311 directly.

Similar to transistor 207 of FIG. 2, there is effectively zero DC current flowing into the gates of transistors 307A and 307B of FIG. 3 since transistors 307A and 307B are also coupled in source follower configurations. Accordingly, there is effectively zero DC voltage drop across resistor 305A. Thus, a large resistance value may be used for resistor 305A. Hence, large RC time constants may be realized with resistor 305A and capacitor 305B without the need for capacitor 305B to be very large. As a result, resistor 305A and capacitor 305B may both be incorporated on chip 301.

In one embodiment of the present invention, $V_{CCP}$ 313 has a value of 2.5 volts and $V_{CC}$ 311 has a value of 1.8 volts. The $V_{TN}$ of diode configured transistor 303B is about 0.425 volts causing $V_{REF}$ 319 and $V_{FILTER}$ 321 to have a value of about 2.2 to 2.3 volts. Correspondingly, the $V_{TN}$ of source follower configured transistors 307A and 307B are also about 0.425 volts resulting in $V_{CCA}$ 323 also having a value of 1.8 volts. Thus, the DC potential of $V_{CC}$ 311 is substantially equal to the DC potential of $V_{CCA}$ 323.

In the embodiment, resistor 305A has a resistance of one megaohm and capacitor 305B has a capacitance of one nanofarad. With these resistor and capacitor values, the resulting RC time constant of filter circuit 305 is approximately one millisecond. In contrast with the prior art power supply noise filter described in FIG. 1, it is noted that the same RC time constant, one millisecond, is achieved with the filter circuit 305 of the present invention using a capacitance of only one nanofarad instead of the 100 millifarad capacitor used by the RC circuit 119 and 121 of the prior art embodiment. It is appreciated that other implementations of filter circuit 305 having other resistance and capacitance values may be employed, depending on the desired filtering characteristics.

In summary, the power supply noise filter shown in FIG. 3 regulates the higher supply voltage $V_{CCP}$ 313 to generate output voltage $V_{CCA}$ 323 at the outputs of transistors 307A and 307B. With filter circuit 305, output voltage $V_{CCA}$ 323 is relatively free of power supply noise. Furthermore, CPU power supply $V_{CC}$ 311 has the same DC potential as output voltage $V_{CCA}$ 323. The power supply noise filter of FIG. 3 generates $V_{CCA}$ 323 by generating the reference voltage:

$$V_{REF} = V_{CC} + V_{TN} \qquad \text{(Equation 1)}$$

where $V_{TN}$ is equal to voltage drop across diode configured transistor 303B. $V_{REF}$ 319 is filtered by filter circuit 305 which generates $V_{FILTER}$ 321. $V_{FILTER}$ 321 is used to drive the gate of source follower configured transistors 307A and 307B to generate $V_{CCA}$ 323. In order for $V_{CCA}$ 323 to be equal to CPU voltage $V_{CC}$ 311, the threshold voltage $V_{TN}$ of transistors 307A and 307B must be substantially equal to the voltage drop $V_{TN}$ across diode configured transistor 303B. Thus, by using diode configured transistor 303B followed by an RC filter comprised of resistor 305A and capacitor 305B, $V_{CCA}$ 323 is generated. $V_{CCA}$ 323 has the same DC potential as $V_{CC}$ 311. With filter circuit 305, the power supplied with $V_{CCA}$ 323 is substantially free of noise.

It is appreciated that if transistor devices 307A and 307B are sufficiently large, then their parasitic capacitance will help reduce noise directly, while their high transconductance will provide a low effective power supply impedance. It is further noted that in addition to reducing AC noise on the power supply, the power supply noise filter of FIG. 3 can also reduce the DC drops that can be present in a large circuit. This is particularly important for a clock distribution network which needs to distribute a clock signal across a large chip. That is, if the clock distribution network power supply is shared with the power supply for the microprocessor core power supply, then noise generated by the microprocessor core could cause the delay of the gates in the clock distribution network to vary.

With the present invention, however, clock distribution network 307B receives filtered power $V_{CCA}$ 323 from source follower configured transistor 307B and the portion of integrated circuit 317, e.g. a microprocessor core, is directly coupled to receive power from CPU power $V_{CC}$ 311. Hence, the gates of clock distribution network 307B do not suffer from delay caused by power supply noise. Similarly, phase locked loop 307A also receives filtered power $V_{CCA}$ 323 from source follower configured transistor 307A. Accordingly, the noise sensitive circuitry of phase locked loop 307A is also shielded from power supply noise.

It is also noted that even though the present invention utilizes the second higher power supply $V_{CCP}$ 313, it is not necessary redesign the existing integrated circuit elements to tolerate the second higher voltage. Referring to the embodiment described in FIG. 3, phase locked loop 309A, clock distribution network 309B and the portion of integrated circuit 317 are not required to be able to tolerate the 2.5 volts of $V_{CCP}$ 313. With the present power supply noise filter, phase locked loop 309A, clock distribution network 309B and the portion of integrated circuit 317 in FIG. 3 are only required to tolerate the 1.8 volts of $V_{CCA}$ 323. Only the elements of the present power supply noise filter, e.g. voltage supply circuit 303 and transistors 307A and 307B in FIG. 3, are directly coupled to the second higher power supply $V_{CCP}$ 313. Thus, the present invention can be incorporated easily into existing modern integrated circuit designs.

Finally, it is appreciated that $V_{CCP}$ 313 and the filtered output of filter circuit 305, $V_{FILTER}$ 321 can be distributed throughout chip 301 allowing filtered $V_{CCA}$ 323 to be generated with other source follower configured transistors similar to transistors 307A and 307B to power each buffer in a clock distribution network, such as clock distribution network 307B. Thus, the present invention may be used to filter simultaneously noise from power supplied to a plurality of integrated circuit portions. Since there is effectively zero DC current flowing through filter circuit 305, effectively zero DC voltage drop will be suffered. It is noted that if a dedicated unfiltered power supply is used instead, then it is likely that some gates in clock distribution network 307B would suffer from larger IR voltage drops than others, again leading to an increase in clock skew. It is further noted that although there may be an IR voltage drop across the wiring for $V_{CCP}$ 313, effectively creating noise in $V_{CCP}$ 313, $V_{CCA}$ 323 would not be effected so long as source follower configured transistors 307A and 307B remain in saturation.

In the foregoing detailed description, an apparatus and a method for filtering noise from power supply to a noise sensitive load is described. The apparatus and method of the present invention has been described with reference to specific exemplary embodiments thereof. It will, however, be evident that various modifications and changes may be made thereto without departing from the broader of spirit and scope of the present invention. The present specification and drawings are accordingly to be regarded as illustrative rather than restrictive.

What is claimed is:

1. A power supply noise filter for filtering noise from power supplied to a load, the power supply noise filter comprising:

a voltage supply circuit coupled between a first voltage and a second voltage, the voltage supply circuit configured to supply a third voltage;

a filter circuit coupled to the voltage supply circuit to receive and filter the third voltage; and a first transistor coupled between the first voltage and the load, the filter circuit coupled between the gate of the first transistor and the voltage supply circuit, wherein the first transistor is coupled in a source follower configuration so as to supply a fourth voltage to the load.

2. The power supply noise filter described in claim 1 wherein a difference between the third voltage and second voltages is substantially equal to a threshold voltage of the first transistor.

3. The power supply noise filter described in claim 1 wherein the voltage supply circuit comprises a diode configured transistor coupled between the first and second voltages.

4. The power supply noise filter described in claim 3 wherein the voltage supply circuit further comprises a resistor coupled between the first voltage and the diode configured transistor.

5. The power supply noise filter described in claim 1 wherein the filter circuit comprises an RC circuit.

6. The power supply noise filter described in claim 1 wherein the load comprises a phase locked loop circuit.

7. The power supply noise filter described in claim 1 wherein the load comprises a clock distribution network.

8. A method for filtering noise from power supplied to a load from a power supply comprising the steps of:

supplying a third voltage with a voltage supply circuit coupled between a first voltage and a second voltage;

filtering the third voltage with a filter circuit coupled to the voltage supply circuit; and configuring a first transistor as a source follower between the first voltage and the load wherein the gate of the first transistor is coupled to receive the filtered third voltage so as to provide a fourth voltage to the load.

9. The method described in claim 8 wherein a difference between the third voltage and the second voltage is substantially equal to a threshold voltage of the first transistor.

10. The method described in claim 8 wherein the voltage supply circuit comprises a diode configured transistor coupled between the first and second voltages.

11. The method described in claim 10 wherein the voltage supply circuit further comprises a resistor coupled between the first voltage and the diode configured transistor.

12. The method described in claim 8 wherein the filter circuit comprises an RC circuit.

13. The method described in claim 8 wherein the load comprises a phase locked loop circuit.

14. The method described in claim 8 wherein the load comprises a clock distribution network.

15. A power supply noise filter for supplying power to a noise sensitive load, the power supply noise filter comprising:

a first resistor coupled to a first voltage;

a first transistor coupled-between the first resistor and a second voltage, the gate of the first transistor coupled to the first resistor wherein a third voltage is supplied at the gate of the first transistor;

a second resistor coupled to the gate of the first transistor;

a capacitor coupled between the second resistor and ground;

a second transistor coupled between the first voltage and the noise sensitive load, the gate of the second transistor coupled to the second resistor and capacitor wherein the second transistor is configured as a source follower so as to provide a fourth voltage to the noise sensitive load.

16. The power supply noise filter described in claim 15 wherein a difference between the third voltage and the second voltage is substantially equal to a threshold voltage of the second transistor.

17. The power supply noise filter described in claim 15 wherein the first voltage is approximately 2.5 volts, the second voltage is approximately 1.8 volts, the third voltage is approximately 2.2 volts and the fourth voltage is substantially equal to the second voltage.

18. The power supply noise filter described in claim 15 wherein the second resistor has a resistance of approximately one megaohm and the capacitor has a capacitance of approximately one nanofarad.

19. The power supply noise filter described in claim 15 wherein the noise sensitive load is a phase locked loop circuit.

20. The power supply noise filter described in claim 15 wherein the noise sensitive load is a clock distribution network.

\* \* \* \* \*